Dec. 7, 1965   M. BELTZER ETAL   3,222,218
METAL COATING PROCESS
Filed Jan. 2, 1962

Morton Beltzer
Carl E. Heath, Jr.   INVENTORS
Barry L. Tarmy

BY  *Olin B. Johnson*

PATENT ATTORNEY

United States Patent Office 3,222,218
Patented Dec. 7, 1965

3,222,218
METAL COATING PROCESS
Morton Beltzer, New York, N.Y., and Carl E. Heath, Jr., and Barry L. Tarmy, Berkeley Heights, N.J., assignors to Esso Research and Engineering Company, a corporation of Delaware
Filed Jan. 2, 1962, Ser. No. 163,612
5 Claims. (Cl. 117—213)

This application is a continuation-in-part of application Serial No. 114,089, filed June 1, 1961, now abandoned.

This invention relates to processes of chemical metal plating of porous and non-porous solid bodies which cannot be effectively plated with a continuous metal coating by electroplating and to products of such processes. In particular, this invention relates to a novel process for chemical metal plating upon a surface of a relatively non-conductive substrate bearing chemically bonded ion-exchange groups capable of undergoing ion-exchange reactions with a metal ion selected from the group consisting of gold, platinum, palladium, and silver, the compounds containing such groups being chemically and/or physically bonded to such surface. More particularly, this invention relates to a process for nickel or silver plating a surface which comprises forming a metal salt with an ion-exchange group chemically bonded to such surface, reducing the metallic component of such salt in situ to elemental metal and contacting the resulting metallized surface with silver or nickel ions and a reducing agent.

In the past it has been difficult to bind a thin, uniform metal coating upon materials having a relatively low electrical conductivity, i.e. non-metallic solids such as glass, wood, zeolites, rubber, hydrocarbon polymers such as polystyrene, polyethylene, polypropylene, butyl rubber, cloth, etc., and materials which although containing conductive materials have such conductors dispersed in discontinuous order between materials of relatively low conductivity, e.g. structures containing mixtures of amorphous carbon and graphite. Processes for metal plating used in the past, such as the various silver mirroring techniques and chemical nickel plating processes, have been relatively effective for coating certain essentially flat surfaces. Yet even with surfaces of this type these processes have certain deficiencies such as the absence of control features which absence allows for the coating of areas other than those required to be covered, discontinuous coatings, coatings of varying thickness, a waste of coating materials and time consuming, complicated multi-step processing. More important, however, in many applications the limitations inherent in such processes render them ineffective for coating in depth materials having openings in their external surfaces which communicate with surfaces within the body of the object via passageways of relatively small diameter or other surfaces which are relatively inaccessible, e.g. materials which are porous, sponge-like, fritted, etc.

It now has been discovered that a thin, continuous, uniform film or layer of silver or nickel can be tenaciously bound to a surface of a solid material having ion-exchange groups chemically bonded to an organic compound which is chemically and/or physically bonded to such surface by contacting such surface with a solution containing gold, silver, platinum, and palladium ions thereby displacing a hydrogen atom of said ion-exchange groups and forming the corresponding metal salt by the chemical union of said ions and said ion-exchange groups, contacting the thus formed metal salt with a reducing agent thereby converting the metallic component of said salt to the corresponding elemental metal, thus providing tightly held catalyst sites, and contacting the resulting metal comprising surface with a solution containing silver or nickel ions and a reducing agent for such ions.

In this process the ion-exchange groups preferably have uniformity of distribution and preferably are present in the highest possible concentration per unit of area. The time required to obtain a continuous coating and the ability to effect a continuous coating of the least possible thickness will depend primarily upon such distribution and concentration. Aside from the other advantages hereinafter discussed, this catalyst fixing feature of the instant process accords advantages unattainable by any method of indiscriminate "seeding" of a surface with metal or the reduction of a free or floating solution of similar salts.

It is within the scope of this invention to employ as the substrate to be coated or plated a material preformed with such ion-exchange groups an integral part of its molecular structure, e.g. the ion-exchange resin membranes and the ion-exchange interpolymer membranes hereinafter discussed in detail. Also where a material does not possess such ion-exchange groups integrally bound to its complete and original structure, such groups may be added where such material which is capable of undergoing conventional chemical reactions with a reactant that will chemically bond such groups to its external and/or internal surfaces, e.g. the addition of —$SO_3H$ groups to a polystyrene resin by conventional sulfonation or hydroxylation of suitable polymeric materials. In the alternative, the groups may be added by contacting the surface to be coated with a dye the molecular structure of which leaves exposed on the surface thereof ion-exchange groups of the same type as those found upon the surfaces of cation-exchange membranes, e.g. —$SO_3H$, —$COOH$, —$OH$. Thus, in accordance with the instant process a distribution of catalyst is first effected upon an external surface bearing fixed ion-exchange groups by contacting the surface with a solution containing the desired metal ion, i.e. a metal ion that will catalyze the reduction of silver or nickel in the presence of a reducting agent, such as hydroquinone, etc. Thus, where the material to be coated already possesses ion-exchange groups on the surface, the initial step of the process comprises contacting the ion-exchange surface with an aqueous solution containing ions of one or more of these metals, e.g. an aqueous solution of a salt of such metals, such as the nitrate, a soluble halide, etc. When this solution is brought into contact with a cation-exchange membrane, or any surface having equivalent functional groups exposed on a surface thereof a substitution reaction occurs wherein a metallic ion from the solution replaces one or more hydrogen atoms of a fixed ionic group on the surface, e.g. an —$SO_3H$ group so as to chemically bind the metal ion to the surface by formation of the corresponding metal salt as a part of said surface. The cation of the metal salt, i.e. the metal ion, is then reduced in situ to the elemental metal by contact with a reducing agent, such as hydroquinone, pyrogallol, catechol, hydroxylamine, p-phenylenediamine, p-aminophenol, ferrous oxalate, etc.

For purposes of clarity the embodiments involving silver plating will be discussed separately followed by a discussion of nickel plating in accordance with the invention. Gold, silver, platinum and palladium catalyze the reduction of silver ion in the presence of a suitable reducing agent, e.g. any reducing agent suitable for use as a photographic developer. Once the initial dispersal of catalytic amounts of gold, silver, platinum or palladium or mixtures of any of these metals is present on the surface to be coated in the elemental form, a continuous layer of silver may be laid down upon the membrane surface by contacting the surface with silver ion in the presence of a suitable reducing agent. The catalysis of silver ion reduction by these metals is well known in the art. See, for example, T. H. James, J. Am. Chem. Soc., 61, 648 (1939); H. V. Euler, Z. Elektrochem., 28, 446 (1922); T. H. James, J. Am. Chem. Soc., 62, 3411 (1940); T. J. James, J. Phys. Chem., 45, 223 (1941); M. Proskurnin & A. Frumkin, Z. Physik, Chem., 155A 29 (1931); V. I. Veselovsky, Acta. Physicochim. U.S.S.R., 11, 815 (1939); Kh. S. Bagdasar'yan, J. Phys. Chem. U.S.S.R., 17, 336 (1943); Kh. S. Bagdasar'yan, Acta. Physicochim. U.S.S.R., 19, 421 (1944); T. H. James, J. Am. Chem. Soc., 64, 731 (1942); W. Reindeers and R. W. P. De Vries, Rec. Trav. Chim., 56, 985 (1937). The treating solution, including both silver ion and reducing agent, is preferably prepared just prior to use. Such a solution may be prepared by adding the reducing agent, e.g. hydroquinone, hydroxylamine, etc., to an aqueous solution containing silver ion, e.g. aqueous $AgNO_3$. The silver that is deposited is derived from the solution and is deposited on the previously deposited catalytic sites where silver, platinum, palladium or gold was converted from the corresponding salt to the elemental metal in situ upon the surface to be coated. If the initial deposit is platinum, palladium or gold, these metals will become coated with silver as the catalytic reduction process proceeds so that the reaction changes, e.g. from a gold catalyzed to a silver catalyzed silver ion reduction.

The thickness of the silver layer can be controlled by the number of times the catalytic reduction process is carried out, by varying the concentration of silver ion and reducing agent in the treating solution, by varying the time of contact of treating solution in a single treatment, varying temperature and by controlling the pH of the reducing solution since the reaction rate increases with an increase of pH. Using these guides, one skilled in the art can, by routine experimentation, control this process so as to lay down a silver surface of any desired thickness. It will generally be preferable to carry out the process at room temperature, however, temperatures above the freezing point and below the boiling point of the solution can be used.

Once a continuous layer of silver is formed on the membrane other materials can be electrodeposited upon the silver layer using the silver surfaced material as a cathode in a conventional electrodeposition cell having an electrolyte bath containing the desired metal ion, e.g. copper, the noble metals such as platinum, gold, iridium, rhodium, palladium, etc. as well as the transition metals, e.g. nickel, chromium, iron, cobalt, etc.

When ion-exchange sites are not present upon the surface as, for example, with wood, glass, rubber, cellulose products or a membrane formed solely from linear polystyrene and a non-ionic binder, or any membrane where it is desired to increase the surface density of such sites, the sites may be provided by subjecting the material to conventional sulfonation, hydroxylation or carboxylation processes where the material to be covered can be so treated without adverse effects or by applying to the surface a suitable dye prior to the initial ion-exchange step wherein the catalyst is laid down. For this purpose water soluble dyes are preferred and where the substrate contains minute pores such as a membrane, and the aim is not to coat or block such pores, it is preferable that the dye be adsorbed irreversibly. For example, adsorption of a dye, such as Cochineal Red A, can provide four additional surface exchange sites per molecule, i.e. 3 sulfonic groups and 1 phenolic group. Other well known dyes which are useful for this purpose include Orange 1, Chromotrope 2R, Fast Red B or Bordeaux B, Crystal Ponceau 6R, Amaranth, Cochineal Red A, Orange II, Methyl Orange, Trypan Blue or Diamine 3B, Trypan Red, Cotton Blue or Aniline Blue or Nicholson Blue, etc. The distribution of exchange groups upon the surface is therefore much more extensive and, in many cases, such groups are established where none existed previously. In the application of such dyes, adsorption is due to nonspecific, coulombic attractive forces between the dye and the surface, e.g. the organic matrix of a membrane surface. When the surface is then contacted with a solution of silver, gold, platinum or palladium salts, e.g. providing such ions as $Ag^+$, $Au(SCN)_2^-$, $AuCl_4^-$, $PtCl_4^=$, $PtCl_6^=$, $PdCl_6^=$, etc., metal salts, e.g. sulfonate and phenolate salts, are formed on the surface having a greater continuity than is possible with untreated surfaces.

Thus, when the surface involved is that of an anion-exchange membrane or is non-ionic, the metal surfacing hereinbefore described may be carried out with modifications. Such surfaces can be dyed with one of the aforementioned dyes which leave $—SO_3H$, $—OH$, and/or $—COOH$ groups exposed on the surface. After such groups are available, the catalytic reduction process can be carried out as previously described with cation-exchange membranes.

In addition, an alternative process permits surfacing of strongly basic ion-exchange membranes, containing groups such as polyvinylamidazole which have been quaternarized with methyliodide. These can be coated with silver by formation on the surface of a silver halide or silver hydroxide followed by reduction in situ of the salt which in turn is followed by catalytic reduction of silver ion. This modification differs chemically from the foregoing cation-exchange embodiments in that although a fixed ion-exchange group, e.g. $N^+R_4 \cdot I^-$ (where R is an alkyl group) causes the formation of the silver salt, the salt is formed with the replaceable halide ion. The previous embodiments are preferred. One variation that can be used is to convert the silver halide to the sulfide salt, since silver sulfide is also capable of catalytically reducing silver. Once the initial metal sites are formed on the surface, the same procedure of silver surfacing may be carried out. This may be followed by metal exchange as hereinafter described, or coating as by electrodeposition of other metals on the silver surface or upon the metal used to displace silver.

Gold, platinum, palladium and nickel catalyze the reduction of nickel ion in the presence of a reducing agent. When the process is employed for nickel plating, the procedure aforedescribed for silver plating is followed with the following exceptions. The ion of gold, platinum, or palladium is applied to the ion-exchange surface as before to establish the catalyst sites. Nickel ion is then applied to the catalyst fixed surface in an aqueous solution containing a strong reducing agent, such as a hypophosphite salt, e.g. sodium hypophosphite or potassium hypophosphite. This embodiment is preferably carried out at temperatures above about 65° C.

The metal coated products which can be prepared in accordance with this process are many and varied. A few of the important uses for which this process may be used include the preparation of "printed" circuitry for electrical systems, the preparation of pressure sensitive variable resistors, particulate catalysts for petroleum refining and chemical processes, metal coated porous membranes, decorative paneling, etc.

When the substrate to be covered is an organic membrane, the membrane may be cationic, anionic or non-ionic. Where the membrane is non-ionic and preferably where the membrane is anionic or cationic, the surface is first dyed with one of the suitable dyes herein disclosed which provide $—SO_3H$, $—COOH$ or $—OH$ groups on the surface to be coated. These membranes, coated in accordance with this invention, may therefore include ion-exchange resin membranes and non-ionic or ion-exchange interpolymer membranes.

Ion-exchange resin membranes, i.e. organic membranes, at least 1 component of which is a polyelectrolyte, are well known in the art. Such membranes include in their polymeric structure dissociable ionizable radicals at least 1 ionic component of which is fixed to or retained by a polymeric matrix with at least 1 ion component being a mobile and replaceable ion electrostatically associated with the first component. The ability of the mobile ion to be replaced under appropriate conditions by other ions imparts ion-exchange characteristics to these materials.

The best known of the ion-exchange membranes are the ion-exchange resin membranes which may be prepared by copolymerizing a mixture of ingredients one of which contains an ionogenic substituent. In the case of cationic-exchange resins, these groups are acidic groups, such as the sulfonic acid group, the carboxylic acid group, and the like. In the case of anion-exchange resins, the group is basic in nature and may comprise amine groups, ordinary ammonium groups, the guanidine group, the dicyandiamine group and other nitrogen-containing basic groups. In the case of these anion-exchange resins, the ionizable group is attached to a polymeric compound, such as phenol-formaldehyde resin, a polystyrene divinylbenzene copolymer, a urea-formaldehyde resin, a melamine-formaldehyde resin, a polyalkylene-polyamine-formaldehyde resin, etc. Thus, typical cation resins may be prepared by copolymerizing a N-phenol sulfonic acid with formaldehyde. A typical anion resin may be prepared by copolymerizing a mixture of phenol, formaldehyde and triethylene-tetramine. The preparation and properties of a number of different types of cation-exchange resins are described throughout the literature and in particular in "Ion Exchange," Nachod, Academic Press, Inc., New York (1950); "Ion Exchange Resins", Kunin & Myers, John Wiley & Sons, Inc., New York (1950); "Styrene, Its Polymers and Copolymers and Derivatives," Boundy & Boyer, Reinhold, New York (1950) and in various U.S. patents, e.g. Langer, 2,891,999 and 2,861,045; Bodamer, 2,681,319–20; D'Alelio, 2,366,007–8 and 2,663,702; Hutchison, 2,678,306; Ferris, 2,658,042, etc.

The formation of these ion-exchange resins into membrane or sheet form is well known in the art. In general these membranes are of two forms, the mosaic in which granules of ion-exchange resin are incorporated into a sheet-like matrix of a suitable binder, such as a binder of polyethylene or polyvinyl chloride, and the continuous ion-exchange resin membrane in which the entire membrane structure has ion-exchange characteristics. The latter type of membrane may be formed by molding or casting a partially polymerized ion-exchange resin into sheet form. The formation of these ion-exchange membranes is described, for example, in "Amberplex Ion Permeable Membranes," Rohm & Haas Co., Philadelphia (1952), and in the references mentioned in this publication.

An interpolymer membrane is one which is cast from a solution containing both a polymeric electrolyte or ionogenic material and a matrix polymer so as to form a film composed of these two intermeshed molecular species. A typical interpolymer membrane is made by dissolving linear polystyrene sulfonic acid and a copolymer of acrylonitrile and vinylchloride in N,N-dimethylformamide, casting the solution as a film and evaporating off the solvent. The type of polyelectrolyte used can range from the strong acid type as described above to those which are strong bases, such as quaternary polyvinylimidazolium hydroxides. Membranes of this type are described in U.S. Patent 2,957,206. See also articles by P. H. Gregor et al. in volume 61, Journal of Physical Chemistry, 1957 at pages 141, 151 and 197 and the pages immediately following these citations.

Representative products which are prepared in accordance with this invention are shown in the accompanying drawing.

FIGURE 1 is an enlarged isometric view of a porous membrane which has been metal surfaced in accordance with this invention without surfacing the minute pores extending through the membrane. This effect is preferably achieved by dyeing the surface with a dye of the type aforementioned which is irreversibly adsorbed on the surface. The surface is then coated without substantial deposition of silver in the pores since the rate of the catalytic reduction process is much faster than diffusion into the membrane pores. Likewise, the catalytic reduction reaction occurring on the membrane surface, i.e. in the presence of the previously formed catalyst sites of silver, gold, platinum or palladium, is much faster than the noncatalyzed silver ion reduction in the bulk solution, i.e. that part of the treating solution not in contact with such sites. Therefore, silver ion escaping into the pores with reducing agent is reduced at a much slower rate than that on the surface and can be readily removed after the reduction process on the surface is complete. Such removal may be effected by passing an eluting agent through such pores, for example a solution of thiosulfate or concentrated iodide, chloride or cyanide solutions, etc.

Figure 1:
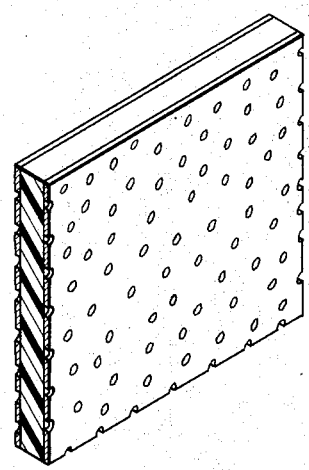
Figure 2:
FIGURE 2 is an enlarged view in cross section of a small piece of foam rubber with both the superficial exterior and the interior pore wall surfaced with a layer of metal of essentially uniform thickness prepared in accordance with the process of this invention. Here the dye is allowed to permeate and coat the walls of all of the major pores before metallization of the surfaces.
Figure 3:
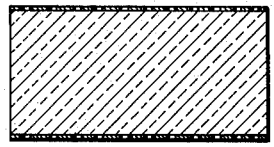
FIGURE 3 is a side view of a glass plate metal coated in accordance with this invention. Where smooth glass is used the surface should be slightly roughened, e.g. by sand blasting, before application of the dye.

The following examples are illustrative of the process of this invention and should not be construed as limitations upon the true scope of this invention as set forth in the specification and claims.

EXAMPLE 1

A membrane sheet having a thickness of about 4 mils and measuring about 10 x 10 inches is metal coated as below described. The membrane employed is a cation-exchange membrane consisting essentially of sulfonated polystyrene.

The membrane is placed in a frame and clamped in position so that the underside is in contact with water. The exposed upper surface is contacted with 150 ml. of a 0.1 normal solution of $AgNO_3$ for a few seconds to effect a surface ion exchange reaction, i.e. substitution of silver ion for hydrogen ion of the $SO_3H$ groups on the membrane surface. This solution is then drained off and the surface contacted is washed with water. This same surface is then contacted with 150 ml. of 0.19 molar hydroquinone aqueous solution which also contains 2 grams per liter of gum arabic to reduce the silver salts on the surface to elemental silver. About 10 ml. of 25% $AgNO_3$ is added to the hydroquinoine solution and agitated for about 5 to 8 minutes. Silver ion is reduced upon the membrane surface resulting in the formation of a film of silver upon such surface. Tests are made of the electrical resistance across the membrane and additional silver ion added and reduced until the resistance across the surface of the membrane is reduced to about 0.014 ohm. The process is repeated upon the opposite side of the membrane. The membrane was then installed in a conventional electrodeposition bath as the cathode and platinum black is electrodeposited upon the silver surface.

EXAMPLE 2

A second membrane is prepared as in Example 1 except that after silver ion is reduced in situ upon the membrane surface the electrode is contacted with an aqueous solution of auric chloride and contact maintained until the metallic silver is converted to silver ion and gold ions reduced to gold upon the membrane surface. The procedure is repeated with aurous thiocyanate with another membrane and the gold surface laid down is more uniform.

EXAMPLE 3

The temperature tolerance of untreated interpolymer membranes is compared with the membranes after metal surfacing in accordance with Example 1. After a short time, about 4 hours, the untreated membrane exhibits an area shrinkage of about 40% at 180° F. A second membrane of the same composition as the first is coated until a definite continuous film of metal is formed over the surface as evidenced by conductivity measurement. With this membrane no evidence of shrinkage is observable at 180° F. after 80 hours.

EXAMPLE 4

Two polystyrene membranes were prepared in accordance with Example 1 except that prior to contact with silver ion the membrane surfaces were painted with a dye, Cochineal Red A, to make available sulfonic groups for ion exchange upon the surface. One such membrane was a non-ionic membrane consisting essentially of polystyrene. The other was a conventional cationic sulfonic acid polystyrene membrane.

EXAMPLE 5

A fritted (sintered) glass cylinder closed at one end, having an average pore diameter of about 10 to 20 microns and a superficial lateral area of 1/50 square foot is metal coated in the following manner: The cylinder is first immersed in an aqueous solution of dye, Orange I, allowing the dye to pass through the porous structure. The dye is adsorbed upon the external surface and the pore on fracture walls. Excess dye is washed off and blown from the cylinder with air. The cylinder is immersed in an aqueous solution of 0.5 molar $AgNO_3$ effecting a uniform distribution of silver salt bonded to the dye. Contact time is about 5 to 10 minutes. The surface is washed free of silver ion. The cylinder is contacted with an aqueous reducing agent, 0.1 molar hydroquinone for about 10 minutes and then washed free of the reducing solution. The cylinder is then immersed in an aqueous solution of $AgNO_3$ (0.05 molar) containing hydroquinone (0.1 molar) and gum arabic (2 grs./liter) for a contact time of about 5 minutes and a uniform continuous silver coating laid down over the dyed surfaces as evidenced by electrical conductivity across the frit. The foregoing is carried out at room temperature. Reduction after the salt formation can be carried out separately or in the presence of silver ion which is used to lay down the coating.

EXAMPLE 6

The process of Example 5 is repeated with the following changes: The substrate coated is a wood block, the dye employed is an aqueous solution of chromotrope 2R, the first solution of $AgNO_3$ is replaced with a similar solution of palladium chloride, and the palladium catalyzed surface is then contacted with an aqueous solution of nickel chloride and sodium hypophosphite and sodium acetate (buffer) until a continuous layer of nickel is formed upon the dyed wood surface. This step is carried out at about 65° C. The block is then placed in a conventional electrodeposition cell and employed as the cathode thereof. Platinum is electrodeposited over the nickel surface.

EXAMPLE 7

The process of Example 5 is repeated with the following changes: The substrate coated is foam rubber. The following dyes are employed on separate pieces of rubber, Bordeau B, Amaranth, Methyl Orange and Trypan Red. The superificial exterior surfaces and the interior pore walls are coated with silver as in Example 4.

EXAMPLE 8

Sand, rocks, cotton cloth, wool sulfonated polypropylene fabric, alumina tubules, molecular sieves (zeolites) and a cellulose sponge are each coated with silver in accordance with the process outlined in Example 5. The coated items are placed in an electric circuit and current is passed through the now conductive structures. Except with membranes where pore clogging is to be avoided, it is not necessary to wash off all dye that is not irreversibly adsorbed. It is necessary that dye, preferably a continuous layer, remain on the surface during the ion-exchange fixation of the catalyst sites, the washing off of excess salt solution, the reduction process and the washing off of the reducing solution so that a minute amount of catalyst will be uniformly distributed over the surface as a result of such steps. The following silver coating will then proceed rapidly with a minimum waste of metal making possible the thinnest possible continuous coating.

The term "relatively non-conductive" as employed herein shall be construed to mean any material or structural composition with a specific resistivity greater than about $10^{-4}$ ohm centimeters. Most materials coated in accordance with this invention will have a specific resistivity in the range of about $10^6$ ohm centimeters or greater.

The term "solid" as employed herein shall be construed to include solids, so-called "semi-solids," e.g. pitch and super cooled liquids, e.g. glass.

The terms "solid material," "solid objects," etc. include both porous and non-porous structures.

The aforedescribed process can, of course, be used to coat a good electron conductor but since such substances are easily coated by electrodeposition the need for such a process is largely confined to relatively non-conductive materials.

It is to be understood that the invention may be practiced with ion-exchange groups, i.e. —$SO_3H$, —COOH, and —OH, existing as such on the surfaces to be coated, or, in the form of one of their water soluble salts, e.g. —$SO_3Na$, —COOK, etc.

What is claimed is:

1. A process for intimately bonding a continuous layer of metal upon a surface of a relatively nonconductive, nonmetallic material wtih a specific resistivity of greater than $10^{-4}$ ohm centimeters which comprises the steps of:
    (a) contacting said material with an aqueous dye solution comprising a dye selected from the group consisting of Cochineal Red A, Orange I, Chromotrope 2R, Fast Red B, Crystal Ponceau 6R, Amaranth, Orange II, Methyl Orange, Trypan Blue, Trypan Red, Aniline Blue and Nicholson Blue,
    (b) contacting said dyed material with an aqueous solution containing metal ions selected from the group consisting of gold, silver, platinum and palladium,
    (c) contacting the surface with an aqueous solution of a reducing agent selected from the group consisting of hydroquinone and hydroquinone with gum arabic, and
    (d) contacting the reduced membrane with an aqueous solution of a metal salt selected from the group consisting of silver and nickel and a reducing agent selected from the group consisting of hydroquinone and sodium hypophosphite and potassium hypophosphite.

2. A process for making a porous material by metal coating a porous substrate with a specific resistivity of greater than $10^{-4}$ ohm centimeters which comprises the steps of:
    (a) contacting said substrate with an aqueous dye solution comprising a dye selected from the group consisting of Cochineal Red A, Orange I, Chromotrope 2R, Fast Red B, Crystal Ponceau 6R, Amaranth, Orange II, Methyl Orange, Trypan Blue, Trypan Red, Aniline Blue and Nicholson Blue,
    (b) contacting said dyed substrate with an aqueous solution containing metal ions selected from the group consisting of gold, silver, platinum and palladium, (c) contacting the surface with an aqueous solution of a reducing agent selected from the group consisting of hydroquinone and hydroquinone with gum arabic, and (d) contacting the substrate with an aqueous solution comprising silver nitrate and hydroquinone thereby forming a metal coated substrate having essentially the same porosity as the uncoated substrate.

3. A process as in claim 2 wherein the dye is Cochineal Red A.

4. A process as in claim 2 wherein the dye is Methyl Orange.

5. A method for metal coating a porous substrate with a specific resistivity of greater than $10^{-4}$ ohm centimeters which comprises the steps of:

(a) contacting the substrate with an aqueous solution of Orange I dye, (b) contacting the dyed substrate with a 0.5 molar $AgNO_3$ solution for about five minutes, (c) contacting the substrate with an aqueous solution of 0.1 molar hydroquinone for about ten minutes, and (d) contacting the reduced substrate with an aqueous solution of 0.05 molar $AgNO_3$, 0.1 molar hydroquinone and 2 gms./liter gum arabic for about five minutes.

References Cited by the Examiner

UNITED STATES PATENTS

| | | | |
|---|---|---|---|
| 2,653,074 | 9/1953 | Blaker | 8—42 XR |
| 2,843,580 | 7/1958 | Straley et al. | 8—42 XR |
| 3,035,944 | 5/1962 | Sher | 117—213 |

OTHER REFERENCES

Metallizing of Plastics: by Narcus Reinhold Publishing Corp., N.Y. 1960, pages 18–25 relied on.

RICHARD D. NEVIUS, *Prmiary Examiner.*